(12) United States Patent
Howe

(10) Patent No.: US 11,440,812 B2
(45) Date of Patent: Sep. 13, 2022

(54) SLOPED SUNSHADE COVER

(71) Applicant: Evoqua Water Technologies Canada ltd, Fredericton (CA)

(72) Inventor: Brent M. Howe, Fredericton (CA)

(73) Assignee: Evoqua Water Technologies LLC, Pittsburgh, PA (US)

( * ) Notice: Subject to any disclaimer, the term of this patent is extended or adjusted under 35 U.S.C. 154(b) by 338 days.

(21) Appl. No.: 16/757,964

(22) PCT Filed: Oct. 2, 2018

(86) PCT No.: PCT/US2018/053877
§ 371 (c)(1),
(2) Date: Apr. 21, 2020

(87) PCT Pub. No.: WO2019/070647
PCT Pub. Date: Apr. 11, 2019

(65) Prior Publication Data
US 2020/0339436 A1    Oct. 29, 2020

Related U.S. Application Data

(60) Provisional application No. 62/566,579, filed on Oct. 2, 2017.

(51) Int. Cl.
| | |
|---|---|
| *E04F 10/06* | (2006.01) |
| *E04H 4/10* | (2006.01) |
| *C02F 1/00* | (2006.01) |
| *B01D 21/00* | (2006.01) |
| *B01D 35/31* | (2006.01) |

(Continued)

(52) U.S. Cl.
CPC .......... *C02F 1/001* (2013.01); *B01D 21/0003* (2013.01); *B01D 33/80* (2013.01); *B01D 35/31* (2013.01); *E04F 10/0607* (2013.01); *E04H 4/108* (2013.01); *C02F 2103/001* (2013.01)

(58) Field of Classification Search
CPC .... B01D 21/0003; B01D 33/80; B01D 35/31; E04F 10/06; E04F 10/0607; E04H 4/108
USPC ........ 210/402, 513, 541, 542; 52/63; 160/66
See application file for complete search history.

(56) References Cited

U.S. PATENT DOCUMENTS

| | | | |
|---|---|---|---|
| 4,279,244 A | 7/1981 | McAlister | |
| 5,670,045 A * | 9/1997 | Schaller | B01D 21/0003 210/541 |

(Continued)

*Primary Examiner* — Christopher Upton

(57) ABSTRACT

A cover for a wastewater treatment unit is disclosed. The cover may include a retractable awning, a frame, and at least one rotating shaft. The retractable awning may be configured to cover the wastewater treatment unit when extended and allow access to the wastewater treatment unit when retracted. The retractable awning may be configured to protect the wastewater treatment unit from ultraviolet light. The frame may be provided to support the retractable awning above the wastewater treatment unit at an incline angle. The angle may allow visibility into the wastewater treatment unit when the retractable awning is extended. The frame may further include a handrail. A system including the wastewater treatment unit positioned within a basin and the cover is also disclosed. Methods of retrofitting a wastewater treatment system and methods of facilitating protection of a wastewater treatment unit are also disclosed.

22 Claims, 4 Drawing Sheets

(51) Int. Cl.
*B01D 33/80* (2006.01)
*C02F 103/00* (2006.01)

(56) References Cited

U.S. PATENT DOCUMENTS

| | | | |
|---|---|---|---|
| 6,260,308 B1 * | 7/2001 | Looney | A01G 9/242 52/63 |
| 6,324,792 B1 | 12/2001 | DeGarie | |
| 6,336,561 B1 * | 1/2002 | Kossik | B01D 33/803 210/402 |
| 7,430,834 B2 * | 10/2008 | Degarie | E04H 4/10 52/63 |
| 8,555,556 B1 | 10/2013 | Howe | |
| 8,770,136 B2 | 7/2014 | Larson | |
| 2002/0108317 A1 | 8/2002 | DeGarie et al. | |

* cited by examiner

SLOPED SUNSHADE COVER

CROSS-REFERENCE TO RELATED APPLICATION

This application claims priority under 35 U.S.C. § 119(e) to U.S. Provisional Application Ser. No. 62/566,579, titled "Sloped Sunshade Cover," filed on Oct. 2, 2017, which is incorporated herein by reference in its entirety for all purposes.

FIELD OF TECHNOLOGY

Aspects and embodiments disclosed herein are generally directed to disc filter systems, and more specifically, to disc filter systems including a retractable cover and methods of operating same.

SUMMARY

In accordance with one aspect, there is provided a cover for a wastewater treatment unit. The cover may comprise a retractable awning, a frame, and at least one rotating shaft. The retractable awning may be configured to cover the wastewater treatment unit in a first extended position and allow access to the wastewater treatment unit in a second retracted position. The retractable awning may be configured to protect the wastewater treatment unit from effects of exposure to ultraviolet light in the first position. The frame may be constructed and arranged to support the retractable awning positioned above the wastewater treatment unit at an incline angle. The incline angle may be selected to allow visibility into the wastewater treatment unit when the retractable awning is in the first position. The frame may comprise a handrail positioned on a first side of the frame adjacent to an apex of the retractable awning. The at least one rotating shaft may be connected to the retractable awning and configured to retract and extend the retractable awning.

In some embodiments, the handrail may extend along a length of the frame.

The retractable awning may further be configured to overhang the first side of the frame in the first position.

In some embodiments, the incline angle may be defined by a width of the base of the frame and a height of the handrail.

The frame may be constructed from a material which is resistant to corrosion. The material may be lightweight and rigid. The material may comprise aluminum, stainless steel, fiberglass, a polymeric material, or combinations thereof.

The retractable awning may be constructed from a polymer coated fabric.

In some embodiments, the retractable awning may further be configured to protect the wastewater treatment unit from debris and weather in the first position.

The retractable awning may be configured to cover a disc filter or a settling basin.

The retractable awning may further be configured to allow limited access to the wastewater treatment unit in an intermediate partially retracted position.

In some embodiments, the frame may comprise at least one removable transverse support bar.

In accordance with another aspect, there is provided a wastewater treatment system comprising a wastewater treatment unit positioned within a basin and a cover positioned above the basin. The cover may comprise a retractable awning and a frame. The retractable awning may be configured to cover the wastewater treatment unit in a first extended position and allow access to the wastewater treatment unit in a second retracted position. The retractable awning may be configured to protect the wastewater treatment unit from effects of exposure to ultraviolet light in the first position. The frame may be constructed and arranged to support the retractable awning positioned above the wastewater treatment unit at an incline angle. The frame may have a base dimensioned to correspond with the basin. The retractable awning may have an incline angle selected to allow visibility into the basin from an adjacent walkway when the retractable awning is in the first position. The frame may comprise a handrail positioned on a first side of the frame adjacent to the walkway and an apex of the retractable awning.

In some embodiments, the wastewater treatment system may comprise a disc filter or a settling basin.

The retractable awning may further be configured to allow limited access to the wastewater treatment unit in an intermediate partially retracted position.

The handrail may extend along a length of the walkway.

The incline angle may be defined by a width of the basin and a height of the handrail.

In accordance with certain embodiments, the cover may further comprise a mechanism configured to retract and extend the retractable awning. The mechanism may comprise at least one rotating shaft connected to the retractable awning. The mechanism may be configured to be manually operated.

The mechanism may comprise an automated controller. The system may further comprise a sensor operably connected to the automated controller. The sensor may be configured to detect at least one of ultraviolet light, debris, and precipitation. The automated controller may be configured to retract or extend the retractable awning responsive to an indication of ultraviolet light, debris, or precipitation received by the sensor.

In accordance with another aspect, there is provided a method of retrofitting a wastewater treatment system comprising a wastewater treatment unit positioned within a basin. The method may comprise installing a cover for the wastewater treatment unit positioned above the basin. The cover may comprise a retractable awning configured to cover the wastewater treatment unit in a first extended position and allow access to the wastewater treatment unit in a second retracted position. The retractable awning may be configured to protect the wastewater treatment unit from effects of exposure to ultraviolet light in the first position. The cover may comprise a frame constructed and arranged to support the retractable awning positioned above the wastewater treatment unit at an incline angle. The frame may comprise a handrail positioned on a first side of the frame adjacent to an apex of the retractable awning. The frame may have a base dimensioned to allow visibility into the basin from a walkway adjacent to the first side of the frame when the retractable awning is in the first position. The incline angle may be selected to allow visibility into the basin from a walkway adjacent to the first side of the frame when the retractable awning is in the first position.

In some embodiments, the method may comprise retrofitting a wastewater treatment system comprising a disc filter or a settling basin.

The method may further comprise installing a mechanism configured to retract and extend the retractable awning. In some embodiments, installing the mechanism may comprise installing at least one rotating shaft connected to the retractable awning. The method may comprise installing a manual control for the mechanism. The method may comprise installing a manual control comprising installing a crank or a gear.

In some embodiments, the method may comprise installing an automated controller for the mechanism. The method may comprise installing a control system. The method may further comprise installing a sensor configured to detect at least one of ultraviolet light, debris, and precipitation and operably connecting the sensor to the automated controller.

In accordance with yet another aspect, there is provided a method of facilitating protection of a wastewater treatment unit positioned within a basin from exposure to environment. The method may comprise providing a cover for the wastewater treatment unit and providing instructions for installing the cover for the wastewater treatment unit above the basin. The cover for the wastewater treatment unit may comprise a retractable awning and a frame. The retractable awning may be configured to cover the wastewater treatment unit in a first extended position and allow access to the wastewater treatment unit in a second retracted position. The retractable awning may be configured to protect the wastewater treatment unit from effects of exposure to ultraviolet light in the first position. The frame may be constructed and arranged to support the retractable awning positioned above the wastewater treatment unit at an incline angle, the incline angle selected to allow visibility into the wastewater treatment unit when the retractable awning is in the first position. The frame may comprise comprising a handrail positioned on a first side of the frame adjacent to an apex of the retractable awning.

In some embodiments, providing the cover for the wastewater treatment unit may further comprise providing a mechanism configured to retract and extend the retractable awning. Providing the mechanism may further comprise providing at least one rotating shaft connected to the retractable awning.

In accordance with certain embodiments, providing the cover for the wastewater treatment unit may further comprise providing a sensor and an automated controller operably connected to the sensor. The sensor may be configured to detect at least one of ultraviolet light, debris, and precipitation. The automated controller may be configured to operate the mechanism to retract or extend the retractable awning responsive to an indication of ultraviolet light, debris, or precipitation received by the sensor.

The method may further comprise providing instructions for installing the retractable awning at the incline angle selected to allow visibility into the basin from a walkway adjacent to the first side of the frame when the retractable awning is in the first position.

The disclosure contemplates all combinations of any one or more of the foregoing aspects and/or embodiments, as well as combinations with any one or more of the embodiments set forth in the detailed description and any examples.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Figure 1:
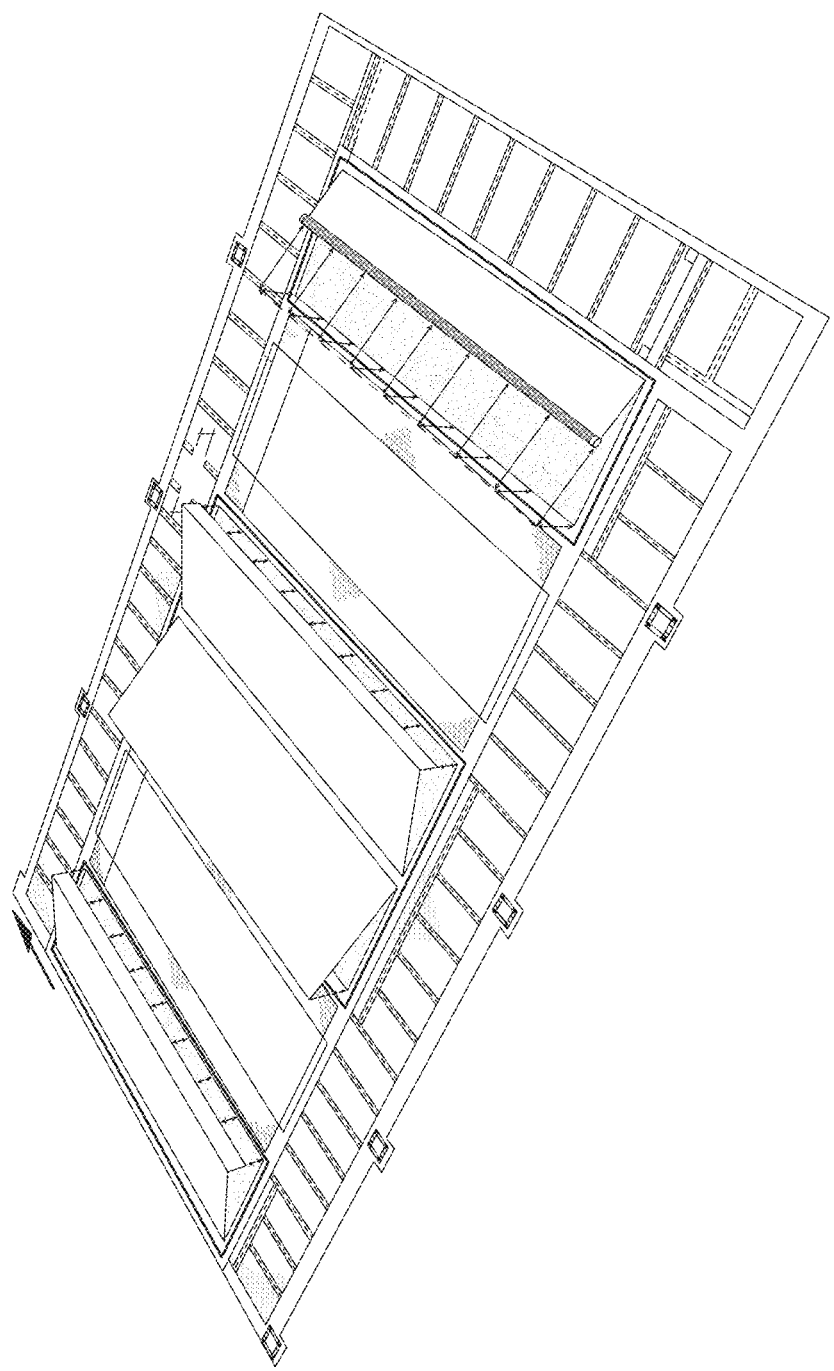
FIG. 1 is a schematic diagram of a wastewater treatment system including a plurality of covers, according to one embodiment.

Water treatment processes typically remove contaminants such as suspended solids, biodegradable organics, phosphorous, nitrogen, microbiological contaminants, or others to provide a clean effluent. Water treatment methods by filtration may include primary, secondary, and tertiary processes to treat wastewater to remove contaminants, such as suspended solids, biodegradable organics, phosphorous, nitrogen, microbiological contaminants, and the like, to provide a clean effluent.

The first or primary treatment process typically involves mechanically separating large solids and other suspended matter in the wastewater from less dense solids and liquid. Primary treatment processes can be done in sedimentation tanks using gravity to provide a primary effluent. Secondary treatment typically includes biological treatment of the primary effluent. The biological treatment units or vessels which can be used for secondary treatment may employ bacteria that break down components of the wastewater, such as organic components. The biological treatment processes in the biological treatment units or vessels may reduce the total organic content and/or biochemical oxygen demand of the wastewater. This is typically done by promoting the consumption of the carbonaceous and nutrient material by bacteria and other types of beneficial organisms already present in the wastewater or mixed into the wastewater. Tertiary processes typically involve removing suspended solids and any remaining contaminants or pollutants from the wastewater such that the treated water can be either reused or discarded safely in the environment. Tertiary processes can include filtration and/or the addition of any one or more of chemicals, UV light, and ozone.

Many wastewater treatment plants utilize a disc filter system to filter water. The disc filter system may include a high flow disc filter, for example, as disclosed in U.S. Pat. No. 9,028,692, herein incorporated by reference in its entirety for all purposes. Such systems typically include a plurality of discs that each comprise a plurality of filter segments. Each filter segment may include a pair of filter panels which are spaced apart and arranged on an outer surface of a central drum. A cap may be attached to the top of each pair of filter panels to form a pocket shaped filter segment for receiving water. Each filter panel may include filter media, such as finely woven cloth, for filtering water.

Each filter panel may be attached to the drum by a filter support arrangement. Each filter support may include a plurality of support openings which provide fluid communication between adjacent filter segments. The support openings generally enable water and air to flow circumferentially between adjacent filter segments as the drum rotates.

In operation, the drum may be rotated and the water to be filtered may be introduced into the drum. The water may then exit through ducts in the drum and flow into filter segments inside the filter support. The water in the filter support may then be filtered through the media of the filter panels to provide filtered water. The filtered water is typically collected in a chamber and exits the disc filter through an effluent pipe. Particulates which are filtered out by the filter panels may remain within the filter segments on the inside surface of the filter media of the filter panels. A spray device may be used to spray the panels with water to dislodge the particulates and clean the filter media. The particulates are then typically collected onto a trough and removed from the disc filter system.

Openings in the central drum that function to provide a passageway for the water to be transferred into the interior of the filter discs are typically larger than the openings of the filter media on the filter panels. Influent wastewater having high Total Suspended Solids (TTS) levels will therefore clog the filter media more quickly, reducing throughput. Furthermore, objects in the wastewater, such as rags and other large objects may flow through the openings in the drum into the interior of the filter panels and become trapped. This results in the loss of effective filter panel filtration area and thus a loss of efficiency. For example, to remove these large objects, the disc filter has to be taken offline and the filter panels have to be removed and cleaned, which is both labor intensive and time consuming.

Although the description refers generally to disc filter systems, it will be appreciated that the systems and methods disclosed herein can be applied to other water and wastewater treatment systems, for example, clarifiers, chlorine contact basins, raw water storage tanks, reclaimed water storage tanks, sand filters, aeration basins, digesters, trickling filters, sludge thickeners, equalization basins, etc. It will also be appreciated that the feature of one embodiment may be used in another.

Water treatment systems may include a treatment unit, for example, a disc filter, disposed in a basin. In accordance with certain embodiments, a cover may be used on a water treatment system to prevent debris from falling into the basin. The cover may be configured such that debris like leaves, twigs, and branches are shielded from the basin. The cover may also be employed to prevent water fowl from landing in the water. In some embodiments, a cover may cut down on the amount of sunlight reaching the basin, which helps to prevent algal blooms that could require the treatment system to be taken offline and cleaned.

Certain wastewater treatment units disposed in a basin may have parts that extend vertically from the basin. Conventional wastewater treatment covers are typically provided to control odor emanating from the treatment system. Such covers may be fitted or substantially fitted to the basin or tank to provide adequate odor control. However, a fitted cover may not be positioned over a wastewater treatment unit that has parts extending vertically from the basin at least because the parts would prevent the cover from being shut.

In some embodiments, a cover can be arranged on an incline to accommodate the wastewater treatment unit. FIG. 1 illustrates one embodiment of the invention. The cover can be arranged to provide sun protection for a water treatment system. The cover may be constructed from a fabric material. The cover may be supported by a frame. The frame may be a metal frame that may be constructed from aluminum. The frame may be sloped. The fabric cover may be retracted manually or with the aid of an automatic device, for example, automatic winches. For instance, the cover may be partially retracted to allow operators to view inside the basin or tank without completely removing the cover.

The basins may be positioned adjacent to one or more walkways. Often, operators may stroll the walkways to observe the water treatment system in the basin. The walkways may be used to check the status or provide maintenance to the water treatment system. To ensure the safety of operators, a handrail and/or a kick plate may be positioned on one or more sides around the perimeter of the basin.

The presence of handrails and/or kick plates can sometimes make it difficult to wind up a cover by hand or by using a hand crank. It will be appreciated that in certain configurations the winding of the cover would be interrupted at every post supporting the transverse handrails. Such interruption in the winding motion is generally needed to allow one's arms to reach over every post supporting the handrails. Similarly, when a power tool is used, the tool must sometimes be stopped and disconnected from the mandrel and reconnected past every post supporting the handrails.

Figure 2:
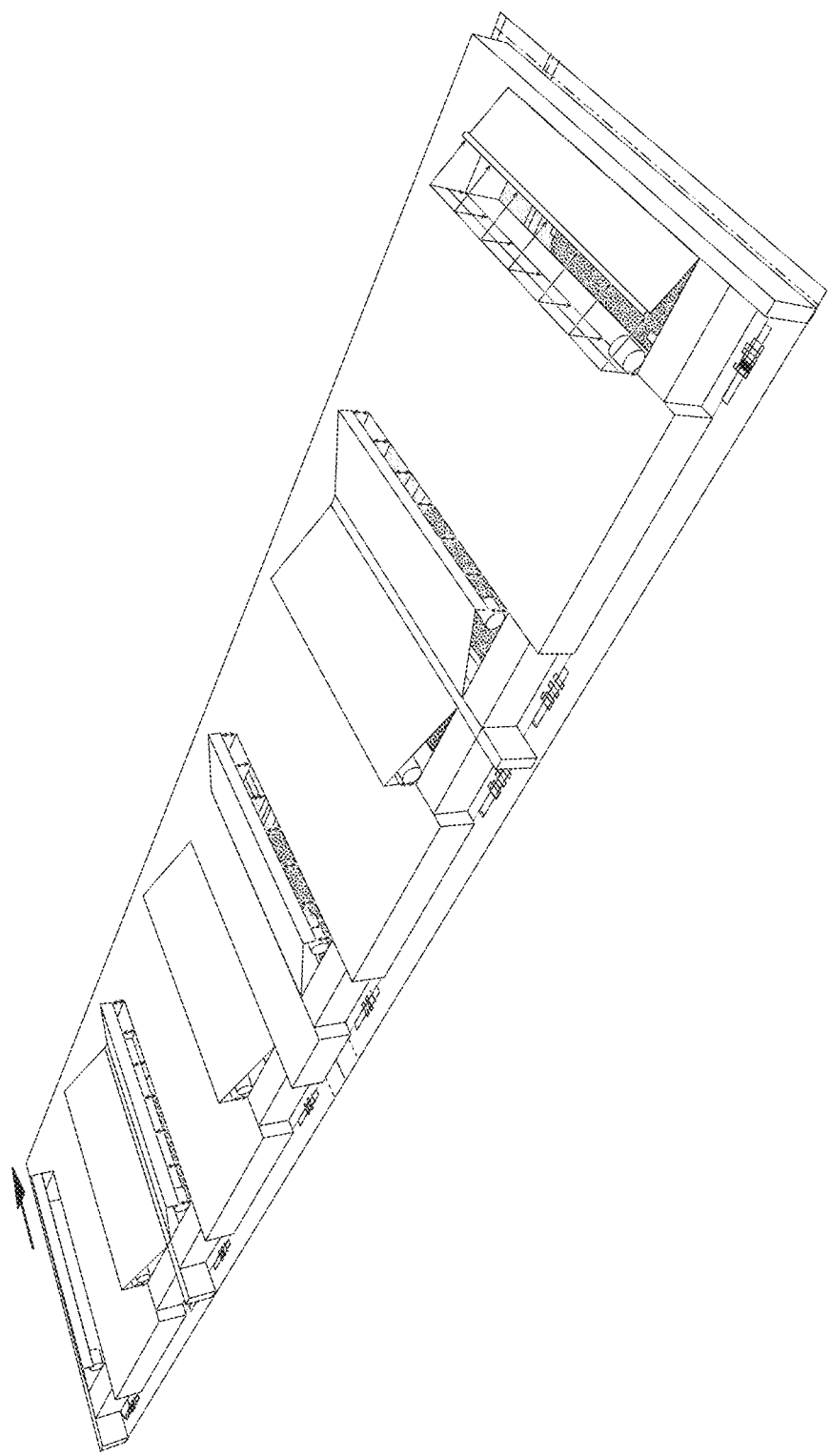
FIG. 2 is a schematic diagram of an alternate wastewater treatment system including a plurality of covers, according to one embodiment.

FIG. 2 illustrates another embodiment of the invention. In some embodiments, the cover may be retracted by rolling up the fabric. The cover may be rolled up by using manual or automatic winches, for example, as accompanied by an electric motor. Portions of the frame used to support the cover may also be used as a guardrail or handrail for operator protection.

As shown in FIGS. 1 and 2, the retractable awning positioned on the frame may be configured such that the cover is open at both ends of the frame. Straps may be attached to the retraction pipe to allow a retracted awning to be pulled closed by an operator standing adjacent to the cover, for example, on an adjacent walkway. The operator may extend the retractable awning (closing the cover) by pulling the strap to extend the rolled retractable awning up the inclined frame, over the apex of the frame, and down the face of the frame to create an overhang. In some embodiments, the operator may be assisted by one or more winches. The overhang may extend partially over the face of the frame, allowing workers to view into the basin while the retractable awning is in the extended position. The apex of the frame can be designed to function as a handrail for operators.

Systems and methods disclosed herein relate to a cover for a wastewater treatment unit. The cover may comprise a retractable awning, a frame, and a mechanism for extending or retracting the retractable awning. The cover may be provided to protect the wastewater treatment unit from the environment. For example, the cover may be provided to protect the wastewater treatment unit from exposure to ultraviolet light, dirt and debris, excess rain or snow, or any other undesirable element which may cause decay or damage to the wastewater treatment unit upon exposure or contact.

In some embodiments, the cover may allow an operator the ability to view into a basin containing the wastewater treatment unit, even when the retractable awning is in an extended position. The position and arrangement of the cover and/or retractable awning may facilitate inspection or maintenance of the wastewater treatment unit. In an extended position, an operator may inspect the wastewater treatment unit by viewing the unit through an opening in the cover. The operator may be able to provide some maintenance when the retractable awning is in the extended position. In an intermediate position, for example, when the retractable awning is partially extended or partially retracted, an operator may be able to inspect the wastewater treatment unit and provide some additional maintenance. Finally, in a retracted position, an operator may be able to inspect the treatment unit, provide maintenance, and/or remove the wastewater treatment unit from the basin for further maintenance at another location. The intermediate or retracted positions may also allow replacement of certain parts of the wastewater treatment unit, for example, of one or more discs of a disc filter.

The cover may be open on transverse ends to allow transverse view of the wastewater treatment unit. The cover may additionally be open on a front end, adjacent to an apex of the retractable awning, to allow direct view of the wastewater treatment unit. In some embodiments, the transverse ends may be closed to provide additional protection from the environment. In some embodiments, the front end may be closed to provide additional protection from the environment. In certain embodiments, the transverse and front ends may be closed. The closed ends may comprise a transparent fabric to maintain the ability to view the wastewater treatment unit. However, an embodiment with closed ends should provide humidity control, to prevent the transparent fabric from collecting condensation. The humidity control may be in the form of slits or openings in the cover. The humidity control may be provided by including a material on the retractable awning or transparent fabric that is resistant to humidity.

The retractable awning may be configured to protect the wastewater treatment unit from effects of exposure to ultraviolet light in the extended position. In some embodiments, the retractable awning may be configured to protect the wastewater treatment unit from debris and weather, for example, precipitation, high winds, or temperature, in the extended position. Generally, the retractable awning may be tensioned in place in the extended position, to prevent excessive movement in high winds. The retractable awning may be retracted in the downward slope direction.

Ultraviolet light may be harmful to certain wastewater treatment systems. The retractable awning may be constructed from a material capable of filtering ultraviolet light and shielding the treatment unit from dirt, debris, and the effects of the weather. The retractable awning may be constructed from a material capable of reflecting or refracting ultraviolet light. The retractable awning may protect system components from accelerated deterioration due to exposure of ultraviolet light, growth of algae, reduce the requirement of disinfectant, and block glare from the water for pilots flying overhead.

The material for the retractable awning may generally be flexible. For instance, the material may be sufficiently flexible to be rolled up. The material may be lightweight. In some embodiments, the material may be light enough to be held up by an aluminum frame. The material may be light enough for an operator to retract or extend the retractable awning with a hand crank. For instance, the material may be light enough for an operator to extend the retractable awning against gravity with a hand crank. The material may be weather proof. For example, the material may be substantially impermeable to water and other liquids. The material may be water-repellant or water-resistant.

In certain embodiments, the retractable awning may be constructed from a polymer coated fabric. The polymer coated fabric may be weather proof. The polymer coated fabric may be impermeable to water and other liquids. For example, the polymer coated fabric may be water-repellant or water-resistant. Suitable polymer coated fabrics include, for example, coated cotton, nylon, linen, and combinations thereof. The fabrics may be coated by submersing the fabric in a polymer solution or by chemical vapor deposition. The fabrics may be coated with, for example, long-chain perfluorinated polymers, short-chain perfluorinated polymers, polyvinyl, polyurethane, polyethylene, or combinations thereof.

The cover may include a frame constructed and arranged to support the retractable awning in a position to protect the wastewater treatment unit from the effects of ultraviolet light, debris, and weather. As the cover may generally be exposed to the elements, the frame may be constructed from a material which is resistant to corrosion. The material may be lightweight and sufficiently flexible to allow manufacturing of the frame. The material may be rigid to support the retractable awning. The frame material may include, for example, aluminum, stainless steel, fiberglass, a polymeric material, or combinations thereof.

The frame may be constructed and arranged to support the retractable awning at an incline angle. To support the retractable awning, the frame may include a base and one or more transverse support bars. The transverse support bars may be constructed and arranged to assist in supporting the retractable awning at the center of the frame. In general, the base of the frame may be open in the center to allow for the wastewater treatment unit positioned in the basin. The one or more transverse support bars may be removable, to allow for removal of the wastewater treatment system from the basin. The base of the frame may be dimensioned to correspond with the basin, for example, with the size and shape of the basin. The frame may be positioned adjacent an operator walkway.

One or more components of the frame may be molded or welded together. In some embodiments, the components of the frame may be provided in parts and the operator may be instructed to assemble them. Thus, the components of the frame may include mating ends or bolts for connecting the one or more components. In general, the transverse support bars may be removable. The removable transverse support bars may include mating ends or bolts for connecting the base of the frame. The one or more components of the frame may be the same or different materials, as needed.

Figure 4A:
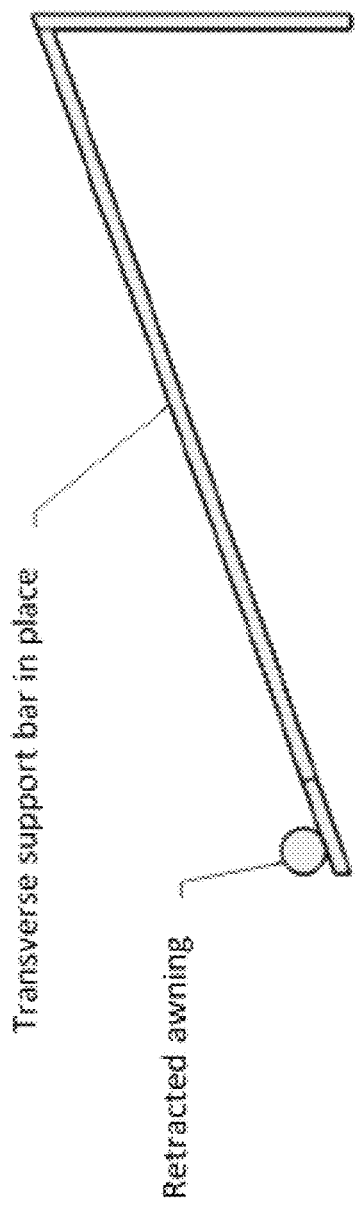
FIG. 4A is a side profile of a frame including a transverse support bar, according to one embodiment.
Figure 4B:
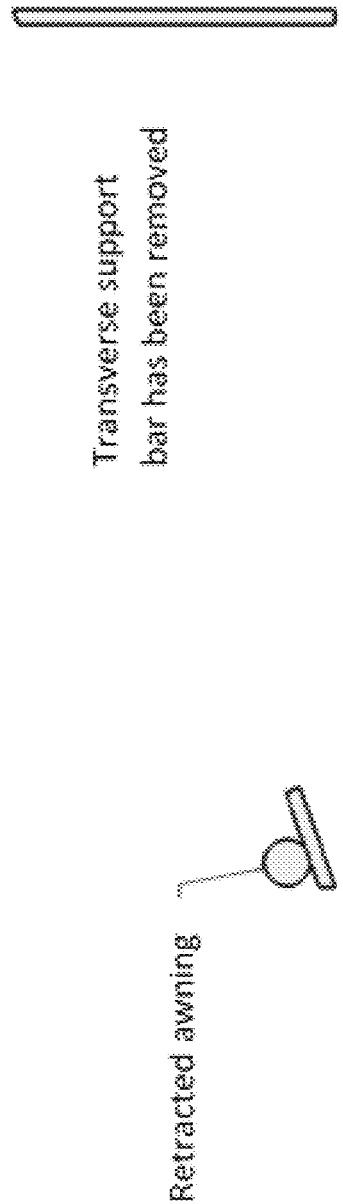
FIG. 4B is a side profile of a frame without its removable transverse support bar, according to one embodiment.

In some embodiments, a portion of the transverse support bar is removable to allow for passage of the wastewater treatment unit, while a portion of the transverse support bar remains fixed such that the retractable awning remains supported. The fixed portion of the transverse support bar may be positioned to support the retractable awning in a retracted or partially retracted position. The removable portion of the transverse support bar may include mating ends or bolts for connecting to the fixed portion on one end and to the base of the frame on the other end. FIGS. 4A-4B are side profiles of the frame. FIG. 4A shows a transverse support bar in place. FIG. 4B shows an embodiment in which a portion of the transverse support bar has been removed to allow passage of the wastewater treatment unit. The one or more components of the transverse support bar may be the same or different materials, as needed.

The frame may comprise a handrail positioned on a side of the frame adjacent to an apex of the retractable awning. For example, the handrail may be positioned on a front end of the cover. In some embodiments, the frame may comprise additional handrails positioned on one or more transverse ends of the cover. The handrails may be included to assist an operator. In some embodiments, the handrail may extend along a length of the frame. The handrail may generally be positioned on a side of the frame adjacent to the walkway. In such embodiments, the handrail may extend along a length of the walkway.

The handrail may be welded or formed with the frame. In some embodiments, the handrail is attached by methods known to one of ordinary skill in the art, for example, with screws, nuts, bolts, and the like. The handrail may be provided separately from the frame, such that the operator is instructed to attach the handrail accordingly. The handrail may be the same or different material than the frame. In some embodiments, the cover may comprise more than one handrail. For example, the cover may include multiple handrails positioned strategically to provide support for an operator without interfering with the retractable awning or the mechanism to retract or extend the awning.

The frame may further include a kick plate or other structural element for protecting an operator from falling into the basin. The kick plate can be provided or attached to the frame as discussed above with respect to the handrail. The kick plate may be the same or different material than the handrail. In some embodiments, the kick plate extends along a length of the frame.

The retractable awning may further be configured to overhang the side of the frame which includes the handrail, when in the extended position. The overhang may be sufficient to secure the retractable awning in the extended position. In some embodiments, the overhang may be, for example, 5 inches (12.7 cm), 6 inches (15.24 cm), 10 inches (25.4 cm), or 12 inches (30.48 cm). Generally, a heavier retractable awning may require a larger overhang. The cover may further include a mechanism to secure the retractable awning in the extended position. The mechanism may include, for example, fasteners or tie ends.

The frame may be dimensioned to correspond with the wastewater treatment unit or basin. In some embodiments, the frame may have a width between 5 feet (1.5 m) and 15 feet (4.6 m). For example, the frame may have a width of about 5 feet (1.5 m), about 8 feet (2.4 m), about 10 feet (3.0 m), about 12 feet (3.6 m), or about 15 feet (4.6 m). The frame may have a length between about 20 feet (6.1 m) and about 40 feet (12.2 m). For example, the frame may have a length of about 20 feet (6.1 m), about 25 feet (7.6 m), about 30 feet (9.1 m), about 35 feet (10.6 m), or about 40 feet (12.2 m). The width and length of the frame may generally be slightly larger than the basin, such that the frame is securely positioned around a perimeter of the basin.

The height of the frame may be defined by the incline angle of the retractable awning. On one end, the frame may be adjacent to the ground. On the other end, the end with the handrail, the frame may have a height which corresponds with the apex of the retractable awning. In some embodiments, the apex of the frame may correspond with the height of the handrails. The handrails may be positioned at a height which is generally acceptable for handrails. For example, the handrails may be positioned at a height of between 35 inches (88.9 cm) and 45 inches (114.3 cm). The handrails may be positioned at a height of about 35 inches (88.9 cm), about 38 inches (96.5 cm), about 40 inches (101.6 cm), about 42 inches (106.7 cm), or about 45 inches (114.3 cm). The apex of the frame may be slightly higher than the handrail, to allow for overhang of the retractable awning in the extended position. For example, the height of the frame may be defined by the height of the handrails plus a height of the overhang, as described above. Generally, visibility into the basin may be provided under the handrails. The transverse ends of the frame may generally be dimensioned to have an increasing height from the ground to the apex of the frame.

The incline angle may be selected to allow visibility into the wastewater treatment unit when the retractable awning is in the first position. For example, the retractable awning may have an incline angle selected to allow visibility into the basin from an adjacent walkway when the retractable awning is in the extended position. In some embodiments, the incline angle may be defined by a width of the base of the frame and a height of the handrail. For example, in certain embodiments, the incline angle may be defined by a width of the basin and a height of the handrail. The incline angle may be slightly larger to accommodate for an overhang of the retractable awning, as discussed above. Thus, the incline angle may be defined by a width of the basin and a height of the frame, for example, of the handrails plus the overhang.

Generally, the front end of the frame may define a right angle from the base of the frame to an apex of the frame. In some embodiments, the incline angle may be between 20° and 70°. The incline angle may be, for example, 20°, 30°, 45°, 60°, 65°, 70°, 80°, or as necessary to accommodate the wastewater treatment unit while protecting the wastewater treatment unit from the effects of exposure to ultraviolet light.

In accordance with certain embodiments, the cover may further comprise a mechanism configured to retract and extend the retractable awning. The mechanism may comprise at least one rotating element configured to roll up the retractable awning. The mechanism may comprise more than one rotating element, for example, as needed to effectively extend or retract the retractable awning. The mechanism may be configured to lock in place, such that it prevents the retractable awning from extending or retracting by force of gravity or wind. In some embodiments, the rotating element may be a rotating shaft. The rotating shaft may be connected to the retractable awning. The mechanism may be configured to be manually operated, for example, through the use of one or more hand cranks and/or gears. The mechanism may be configured such that it can be operated with the use of an electric crank, for example, a drill. Additional, rotating shafts may be included as needed.

In some embodiments, the mechanism may comprise one or more winches. The one or more winches may be connected to the retractable awning by rope, cable, strap, or chain. The one or more winches may be operated manually by a crank, or mechanically by a motor or other device. The system may include, for example, one, two, three, four, or five winches per cover. The number of winches may be selected based on the size of the cover. For example, a larger cover may require one or more winches to effectively extend and retract the awning. A larger cover may require one or more winches to avoid entanglement with a transverse support bar of the frame.

The mechanism to retract and extend the retractable awning may comprise an automated controller. the automated controller may be operably connected to the retractable awning and include, for example, a user interface. An operator can instruct the automated controller to extend or retract the retractable awning through the user interface. The user interface may run any operating system known to one of ordinary skill in the art. The automated controller may be configured or programmed to extend or retract the retractable awning on a timer. For example, the automated controller may be configured or programmed to extend or partially extend the retractable awning at sunrise.

The system may further comprise a sensor operably connected to the automated controller. The sensor may be configured to detect at least one of ultraviolet light, debris, and precipitation. The automated controller may be configured to retract or extend the retractable awning responsive to an indication of ultraviolet light, debris, or precipitation received by the sensor. For example, the automated controller may be configured to extend or partially extend the retractable awning responsive to an indication of increasing ultraviolet light, debris, or precipitation. The automated controller may further be configured to retract or partially retract the retractable awning responsive to an indication of decreasing ultraviolet light, debris, or precipitation. In some embodiments, the automated controller may be configured to extend or partially extend the retractable awning responsive to an indication of any ultraviolet light, debris, or precipitation. As disclosed herein, precipitation may include, for example, rain, snow, sleet, or hail. Debris may be detected due to increased wind or a nearby source of debris, for example, construction.

The wastewater treatment unit may be a unit configured to treat storm water or sewer water. In accordance with certain embodiments, the wastewater treatment unit may be a disc filter, as described above. The disc filter may be part of a disc filter system. For example, the disc filter may be positioned within a basin. The basin may have an inlet for source water and an outlet for treated water. In some embodiments, the source water may be storm water or sewer water. The disc filter may be subject to periodic maintenance to remove filtered contaminants. The periodic maintenance may be performed when the retractable awning is retracted or partially retracted. An operator may decide whether the disc filter is in need of maintenance by viewing the disc filter when the retractable awning is extended or partially extended.

Generally, settling basins may deteriorate faster with increased exposure to ultraviolet light. In accordance with certain embodiments, the wastewater treatment system may include a settling basin. The settling basin may include tube settlers or plate settlers disposed therein. In some embodiments, the plate settlers may be parallel plate settlers or inclined plate settlers. The settlers and/or settling basin may be protected from the environment with installation of the cover. Settlers may be subject to periodic maintenance, which can be performed when the retractable awning is retracted or partially retracted. The extended or partially extended retractable awning may allow regular inspection of the settling basin without retraction of the awning.

The system may include more than one wastewater treatment unit. In such a system, the cover may be configured to cover more than one wastewater treatment unit. The system may include a cover for each wastewater treatment unit. The plurality of covers may be positioned to correspond with the walkways provided between wastewater treatment units or basins. For example, the covers may be positioned such that a front end of each cover, including the handrail, is adjacent to a walkway of the system.

Methods of retrofitting a wastewater treatment system are disclosed herein. Wastewater treatment systems that may be retrofitted include systems having a wastewater treatment unit positioned within a basin. The treatment system may be one configured to treat storm water or sewer water. For instance, systems which have a treatment unit extending vertically from the basin may be retrofitted with an inclined retractable awning, as disclosed herein. Wastewater treatment systems which may benefit from protection against ultraviolet light exposure, debris, and/or precipitation may be retrofitted with a cover, as disclosed herein. The system to be retrofitted may include, for example, a disc filter treatment unit, a settling basin, or other treatment unit as previously described. The methods of retrofitting an existing system may include installing a cover including a retractable awning to be positioned above the basin.

The method may further comprise installing a mechanism configured to retract and extend the retractable awning. In some embodiments, installing the mechanism may comprise installing at least one rotating shaft and connecting the rotating shaft to the retractable awning. The method may comprise installing a manual control for the mechanism, for example by connecting a crank and/or a gear. The crank may be a hand crank. The method may include installing more than one mechanism to retract and extend the retractable awning, as needed.

In some embodiments, the method may comprise installing an automated controller for the mechanism. Installing the automated controller may comprise programming the automated controller to extend or retract the retractable awning as needed or on a timer. The method may comprise installing a control system. The control system may include a user interface. The method may comprise programming the user interface to direct operation of the retractable awning, for example, responsive to a user command or a timer. The method may further comprise installing a sensor configured to detect at least one of ultraviolet light, debris, and precipitation and operably connecting the sensor to the automated controller. The method may comprise programming the sensor or automated controller to operate accordingly.

Methods of facilitating protection of a wastewater treatment unit or system from exposure to environment are also disclosed herein. The method may comprise providing a cover for the wastewater treatment unit, as described above. The method may comprise providing instructions for installing the cover for the wastewater treatment unit above the basin. For example, the method may include instructing an operator to install the cover above the basin, such that the wastewater treatment unit is protected from ultraviolet light, debris, and precipitation.

In some embodiments, providing the cover for the wastewater treatment unit may further comprise providing a mechanism configured to retract and extend the retractable awning. For example, the method may include providing at least one rotating shaft and a connecting element to the retractable awning. The method may include providing one or more winches to retract or extend the retractable awning. The method may include providing an automated controller, which may or may not include a control module and a user interface. The method may include programming the automated controller accordingly. The methods of facilitating protection of a wastewater treatment unit may include providing a sensor to detect ultraviolet light, debris, and precipitation, and an automated controller operably connected to the sensor. The method may include operably connecting the automated controller to the sensor accordingly.

The methods disclosed herein may include providing instructions for installing the retractable awning at the incline angle. As previously described, the incline angle may be selected to allow visibility into the basin from a walkway adjacent to the first side of the frame when the retractable awning is in the first position. The method may include instructing an operator to install the retractable awning or installing the retractable awning and instructing an operator how to retract and extend the awning accordingly.

Figure 3:
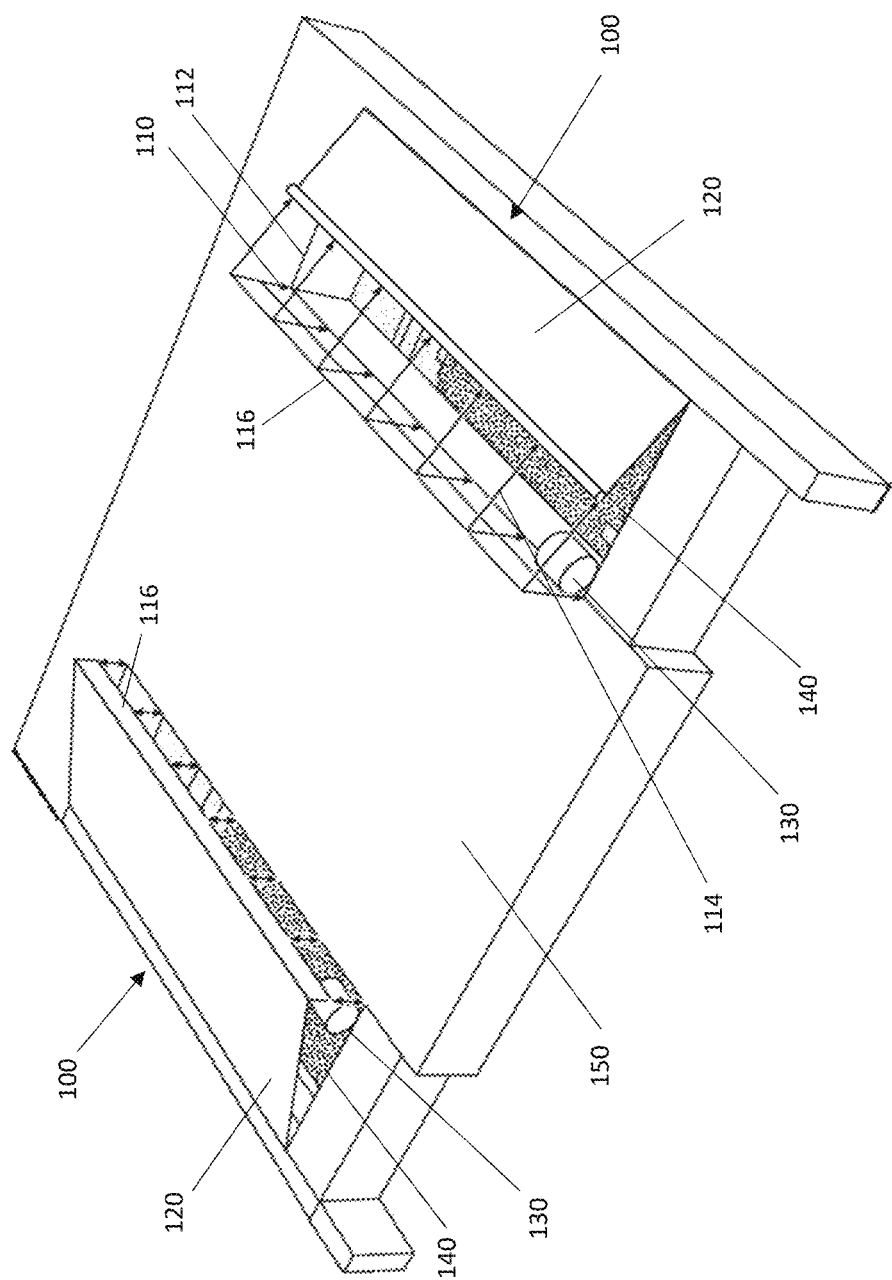
FIG. 3 is a schematic diagram of a cover positioned above a wastewater treatment unit, according to one embodiment.

As shown in FIG. 3, an exemplary cover 100 can include a frame 110 and a retractable awning 120. The cover 100 can be positioned above a basin 140 including a wastewater treatment unit. The cover 100 can be positioned adjacent to a walkway 150. The frame 110 can include base 112, one or more transverse beams 114, and a handrail 116. In some embodiments (not shown) the frame can include a kick plate positioned on the same side as the handrail 116. The cover 100 can include mechanism 130 for retracting and extending the retractable awning 120.

The phraseology and terminology used herein is for the purpose of description and should not be regarded as limiting. As used herein, the term "plurality" refers to two or more items or components. The terms "comprising," "including," "carrying," "having," "containing," and "involving," whether in the written description or the claims and the like, are open-ended terms, i.e., to mean "including but not limited to." Thus, the use of such terms is meant to encompass the items listed thereafter, and equivalents thereof, as well as additional items. Only the transitional phrases "consisting of" and "consisting essentially of," are closed or semi-closed transitional phrases, respectively, with respect to the claims. Use of ordinal terms such as "first," "second," "third," and the like in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Having thus described several aspects of at least one embodiment, it is to be appreciated various alterations, modifications, and improvements will readily occur to those skilled in the art. Any feature described in any embodiment may be included in or substituted for any feature of any other embodiment. Such alterations, modifications, and improvements are intended to be part of this disclosure, and are intended to be within the scope of the invention. Accordingly, the foregoing description and drawings are by way of example only.

Those skilled in the art should appreciate that the parameters and configurations described herein are exemplary and that actual parameters and/or configurations will depend on the specific application in which the disclosed methods and materials are used. Those skilled in the art should also recognize or be able to ascertain, using no more than routine experimentation, equivalents to the specific embodiments disclosed.

What is claimed is:

1. A cover for a wastewater treatment unit, comprising
a retractable awning configured to cover the wastewater treatment unit in a first extended position and allow access to the wastewater treatment unit in a second retracted position, the retractable awning configured to protect the wastewater treatment unit from effects of exposure to ultraviolet light in the first position;
a frame constructed and arranged to support the retractable awning positioned above the wastewater treatment unit at an incline angle, the incline angle selected to allow visibility into the wastewater treatment unit when the retractable awning is in the first position, the frame comprising a handrail positioned on a first side of the frame adjacent to an apex of the retractable awning; and
at least one rotating shaft connected to the retractable awning and configured to retract and extend the retractable awning.

2. The cover of claim 1, wherein the handrail extends along a length of the frame.

3. The cover of claim 1, the retractable awning further being configured to overhang the first side of the frame in the first position.

4. The cover of claim 1, wherein the incline angle is defined by a width of a base of the frame and a height of the handrail.

5. The cover of claim 1, wherein the frame is constructed from a material which is resistant to corrosion.

6. The cover of claim 5, wherein the material is lightweight and rigid.

7. The cover of claim 6, wherein the material comprises aluminum, stainless steel, fiberglass, a polymeric material, or combinations thereof.

8. The cover of claim 1, wherein the retractable awning is constructed from a polymer coated fabric.

9. The cover of claim 1, the retractable awning further being configured to protect the wastewater treatment unit from debris and weather in the first position.

10. The cover of claim 1, wherein the retractable awning is configured to cover a disc filter or a settling basin.

11. The cover of claim 1, wherein the retractable awning is further configured to allow limited access to the wastewater treatment unit in an intermediate partially retracted position.

12. The cover of claim 1, wherein the frame comprises at least one removable transverse support bar.

13. A wastewater treatment system comprising a wastewater treatment unit positioned within a basin and a cover positioned above the basin,
the cover comprising
a retractable awning configured to cover the wastewater treatment unit in a first extended position and allow access to the wastewater treatment unit in a second retracted position, the retractable awning configured to protect the wastewater treatment unit from effects of exposure to ultraviolet light in the first position; and
a frame constructed and arranged to support the retractable awning positioned above the wastewater treatment unit at an incline angle,
the frame having a base dimensioned to correspond with the basin, and
the retractable awning having an incline angle selected to allow visibility into the basin from an adjacent walkway when the retractable awning is in the first position and the frame comprising a handrail positioned on a first side of the frame adjacent to the walkway and an apex of the retractable awning.

14. The wastewater treatment system of claim 13, comprising a disc filter or a settling basin.

15. The wastewater treatment system of claim 13, wherein the retractable awning is further configured to allow limited access to the wastewater treatment unit in an intermediate partially retracted position.

16. The wastewater treatment system of claim 13, wherein the handrail extends along a length of the walkway.

17. The wastewater treatment system of claim 13, wherein the incline angle is defined by a width of the basin and a height of the handrail.

18. The wastewater treatment system of claim 13, the cover further comprising a mechanism configured to retract and extend the retractable awning.

19. The wastewater treatment system of claim 18, wherein the mechanism comprises at least one rotating shaft connected to the retractable awning.

20. The wastewater treatment system of claim 18, wherein the mechanism is configured to be manually operated.

21. The wastewater treatment system of claim 18, wherein the mechanism comprises an automated controller.

22. The wastewater treatment system of claim 21, further comprising a sensor operably connected to the automated controller, the sensor configured to detect at least one of ultraviolet light, debris, and precipitation, and
the automated controller configured to retract or extend the retractable awning responsive to an indication of ultraviolet light, debris, or precipitation received by the sensor.

* * * * *